Patented Feb. 17, 1942

2,273,101

UNITED STATES PATENT OFFICE 2,273,101

IRON OXIDE PIGMENTS AND PROCESS OF PRODUCING THE SAME

Ulrich Haberland, Krefeld-Uerdingen, Germany, assignor, by mesne assignments, to General Aniline & Film Corporation, New York, N. Y., a corporation of Delaware No Drawing. Application April 17, 1939, Serial No. 268,347. In Germany April 16, 1938

13 Claims. (Cl. 106—304)

(Granted under the provisions of sec. 14, act of March 2, 1927; 357 O. G. 5)

The present invention relates to a process for the production of iron oxide pigments: more specifically it relates to a process in which finely divided iron hydroxides are obtained as by-products from the reduction of aromatic nitro compounds to the corresponding amines by means of iron and acids, for example hydrochloric acid, or acid reacting salts. The invention also embraces the new products.

In the methods of producing aromatic amines known and used for a long time involving the use of iron and an amount of acid insufficient to dissolve the same, the iron which is used as the reducing agent generally changes into a brown-black oxide whose composition corresponds to a formula lying between $Fe_3O_4$ and $Fe_2O_3$. This oxide is not useful as a color pigment and is of very inferior quality on account of its low coloring power.

As set forth in the U. S. Patents 1,774,930; 1,774,931; 1,774,932; 1,835,409, and 1,857,557 finely divided iron oxides or iron hydroxides of high commercial value are obtained by carrying out the reduction in the presence of a compound of a trivalent or a tetravalent metal, for example a dilute aqueous solution of an aluminium salt or a preferably acid reacting dilute aqueous solution of one or more salts of other trivalent or tetravalent metals or an aqueous suspension of sparingly soluble basic compounds, as for example the hydroxides, oxides or slightly soluble basic salts of the said trivalent or tetravalent metals, whereby the compounds of aluminium, iron and of the rare earth metals are especially mentioned.

It has now been found, that pigments of essentially improved properties, which are shown inter alia by a brightening of the color shade as well as in a considerably increased coloring power are obtained if the reduction of the aromatic nitro compounds to amines is carried out in the presence of the additions customary in the above mentioned known processes and moreover with the addition of water-soluble tin salts, for example stannous chloride or aqueous solutions of these salts.

If the reduction is carried out in this manner in the presence of a tin salt (the process not essentially departing in other respects from the customary processes, as will be evidenced by the examples hereinafter set forth) there remains after the separating of the aromatic amine, for example aniline, a sludge which contains the oxidized iron as a finely divided yellow hydroxide of the trivalent iron oxide $Fe_2O_3$. After levigation, washing out and drying this hydroxide is useful as a color pigment showing the above mentioned essentially improved properties either directly or, if red shades are desired, after being subjected to a preliminary calcination.

A ready made solution of the above mentioned salts may be employed, to which a further addition of acid, for example hydrochloric acid, may be unnecessary on account of the known hydrolysis of these salts leading to the production of sufficient free acid for the reduction. The salts may, however, also be produced during the reaction, i. e., by the addition to the required quantity of the metal and acid.

The hydroxides, oxides or basic salts employed in the reduction of aromatic nitro compounds may be added to the reaction mixture in a ready-made state but preferably they are formed from soluble salts by the addition of a basic substance, such as a hydroxide of the alkaline and alkaline earth metals, carbonates or organic bases to their solution.

The process is illustrated by the following examples. It is to be understood, however, that the process according to the present invention is capable of being carried out with other nitro compounds than those mentioned in the examples, for example with hydroxy-, chloro- and aminonitro compounds, polynitro compounds and nitro-sulfonic acids, nitro toluene and α-nitro naphthalene. Other tin salts can be used in place of the stannous chloride, for example stannous sulfate ($SnSO_4$), tin chloride ($SnCl_4$), tin bromide ($SnBr_4$), pink salt ($Sn(NH_4)_2Cl_6$) and so on, and other acids in place of hydrochloric acid, as for example sulfuric acid, formic acid and acetic acid.

Finally it is to be understood that all the compounds of trivalent or tetravalent metals covered by the above mentioned U. S. Patents 1,774,930; 1,774,931; 1,774,932; 1,835,409, and 1,857,557 will be operative in connection with the tin salts according to the process of this invention.

*Example 1*

200 kgs. of nitrobenzene are allowed to run at 100° C. into 250 kgs. of a 3% solution of aluminium chloride ($ClCl_3$) containing 0.5 kg. of stannous chloride ($SnCl_2$) and 200 kgs. of ground iron. The temperature maintains itself at 100° C. due to the heat of reaction. When the reduction is finished the resulting aniline is separated in the well-known manner. There remains a yellowish brown slurry, which is separated from the excess of metallic iron and dried. It consists of an iron hydroxide having an average content of 12% of combined water. By calcination it is converted into a deep violet red iron oxide pigment.

*Example 2*

200 kgs. of ortho-nitro toluene are reduced in a solution of 18 kgs. of aluminium chloride and 3 kgs. of stannous chloride in 310 kgs. of water with 200 kgs. of iron. After distillation of the ortho-toluidine produced, a yellow hydroxide of iron having a water content of about 12% is obtained from the residues, which product on heating to 500° C. yields a brilliant red iron oxide pigment of high coloring power.

*Example 3*

200 kgs. of nitro naphthalene are reduced in a solution of 20 kgs. of aluminium chloride, 2 kgs. of stannous chloride, 400 kgs. of water and 10 kgs. of hydrochloric acid (sp. gr. 1.16) with 200 kgs. of iron. When the reduction is complete the naphthylamine produced is extracted by means of solvents. The remaining yellow residues are freed from any remaining solvents by treatment with steam, then washed and centrifuged. By calcination a brilliant red iron oxide is obtained.

*Example 4*

200 kgs. of nitro benzene are reduced in 400 kgs. of a 7.5% aqueous solution of hydrochloric acid by means of 220 kgs. of iron, 6 kgs. of aluminium metal and 6 kgs. of stannous oxide (SnO). In the course of the reaction aluminium and stannous oxide are dissolved. The iron hydroxide which is obtained as a by-product of the reduction has nearly the same properties as in the foregoing example. The quantity and concentration of the hydrochloric acid used may be varied within wide limits, e. g. less than the amount equivalent to the aluminium metal can be used.

*Example 5*

200 kgs. of nitro benzene are allowed to run at 100° C. into a vigorously agitated mixture of a solution of 40 kgs. of cerium chloride and 0.2 kg. stannous chloride in 300 litres of water and 200 kgs. of ground iron. The temperature maintains itself at 100° C. due to the heat of reaction. When the reduction is finished the resulting aniline is separated in the well known manner. There remains a brilliant brown slurry, which is separated from the excess of metallic iron and dried. It consists of an iron hydroxide having an average content of 11.3 percent of chemically combined water. By calcination it is converted into a deep violet red iron oxide pigment.

*Example 6*

200 kgs. of nitro benzene are reduced by means of a solution of 0.5 kg. of cerium chloride and 25 kgs. of stannous chloride in 250 kgs. of water and 200 kgs. of ground iron as set forth in Example 5. The resulting slurry has a brown color and consists of an iron hydroxide having an average content of 9 percent of chemically combined water.

*Example 7*

200 kgs. of ground iron are gradually admitted to a mixture of 200 kgs. of ortho-nitro toluene and a solution of 2 kgs. of lanthanium chloride and 30 kgs. of stannous chloride in 250 litres of water. When the reduction is complete, the formed ortho-toluidine is separated in a well known manner. The remaining slurry consists of a bluish red iron hydroxide having an average content of 11.4 percent of chemically combined water.

*Example 8*

200 kgs. of para-introchloro benzene are reduced by means of a solution of 5 kgs. of didymium chloride and 20 kgs. of tin chloride in 200 litres of water and 200 kgs. of iron. The produced iron hydroxide has a brown red color and generally contains 9.6 percent of chemically combined water.

*Example 9*

200 kgs. of nitro naphthalene are reduced in a solution of 20 kgs. of cerium chloride and 2 kgs. of stannous chloride in 400 litres of water and 10 kgs. of hydrochloric acid (sp. gr. 1.16) by gradually adding 200 kgs. of iron. After complete reduction the naphthylamine produced is extracted by means of solvents. The brown red residue yields a brilliant red iron oxide by calcination.

*Example 10*

200 kgs. of nitro benzene are reduced by means of a solution of 20 kgs. of cerium sulfate and 4 kgs. of stannous sulfate in 250 litres of water while gradually adding 200 kgs. of ground iron. The resulting residue yields a brilliant red iron oxide by calcination.

*Example 11*

Aluminium is precipitated from a solution of 40 kgs. of aluminium sulfate in 300 litres of water by means of the calculated amount of a soda solution to form highly basic insoluble aluminium sulfate in a finely divided state. This mixture is admtted to 200 kgs. of ground iron, without separating the solution from the precipitate; then a concentrated aqueous solution of 60 kgs. of aniline hydrochloride and 2 kgs. of tin chloride is added and 200 kgs. of nitro benzene are allowed to run at 100° C. into the agitated mixture as usual in processes for reducing aromatic nitro compounds. After separating the formed aniline, there remains a yellowish-brown slurry consisting of an iron hydroxide having an average content of 13 percent of chemically combined water. By calcination it is converted into a brilliant red iron oxide.

*Example 12*

A finely divided cerium hydroxide is precipitated while stirring a solution of 10 kgs. of cerium chloride in 150 litres of water by means of 40 kgs. of aniline. 3 kgs. of tin chloride and 200 kgs. of nitro benzene are added to this mixture and are reduced in the well known manner by gradually adding 200 kgs. of iron. The resulting residue is an iron hydroxide of a brown-red color having an average content of 8 percent of chemically combined water.

I claim:

1. In the process of reducing an aromatic nitro compound involving the treatment of the nitro compound with iron and an agent hydrolysable in water to produce hydrogen ions, to the production of the corresponding amine and an iron oxide sludge, the steps which consist in reducing in the presence of an aqueous solution of a tin salt and of a compound other than the tin salt of a metal selected from the group consisting of a trivalent and a tetravalent metal and thereafter separating the sludge from the reaction mixture and purifying the sludge by levigating and washing out.

2. In the process of reducing an aromatic nitro compound involving the treatment with iron and an agent hydrolysable in water, to produce hydrogen ions, to the production of the corresponding amine and an iron oxide sludge, the steps which consist in reducing in the presence of an aqueous solution of stannous chloride and of a compound of a metal selected from the group consisting of a trivalent and a tetravalent metal and thereafter separating the said sludge from the reaction mixture and purifying the separated sludge by levigating and washing out.

3. In the process of reducing an aromatic nitro compound involving the treatment with iron and an agent hydrolysable in water to produce hydrogen ions, to the production of the corresponding amine and an iron oxide sludge, the steps which consist in reducing in the presence of a dilute aqueous solution of aluminium chloride and stannous chloride, and thereafter separating the said sludge from the reaction mixture and purifying the separated sludge by levigating and washing out.

4. In the process of reducing an aromatic nitro compound involving the treatment with iron and an agent hydrolysable in water to produce hydrogen ions, to the production of the corresponding amine and an iron oxide sludge, the steps which consist in reducing in the presence of an aqueous solution of a tin salt and a compound other than the tin salt of a metal selected from the group consisting of a trivalent and a tetravalent metal produced during the reaction, and thereafter separating the said sludge from the reaction mixture and purifying the separated sludge by levigating and washing out.

5. In the process of reducing an aromatic nitro compound involving the treatment of the nitro compound with iron and an agent hydrolysable in water to produce hydrogen ions, to the production of the corresponding amine and an iron oxide sludge, the steps which consist in adding to the reaction mixture aluminum metal and effecting said reduction in the presence of an acid in an amount insufficient to dissolve the iron and of stannous chloride, and thereafter separating the said sludge from the reaction mixture and purifying the separated sludge by levigating and washing out.

6. In the process of reducing an aromatic nitro compound involving the treatment with iron and an agent hydrolysable in water to produce hydrogen ions, to the production of the corresponding amine and an iron oxide sludge, the steps which consist in reducing in the presence of a mixture of a dilute aqueous solution of a tin salt and of a salt containing aluminium as metallic base and of an acid in amount insufficient to dissolve the iron, separating the resulting iron oxide sludge from the reaction mixture, and purifying the sludge by levigating and washing out.

7. In the process of reducing an aromatic nitro compound involving the treatment with iron and an agent hydrolysable in water to produce hydrogen ions, to the production of the corresponding amine and an iron oxide sludge, the steps which consist in reducing in the presence of a dilute aqueous solution of alminium chloride, stannous chloride and hydrochloric acid in amount insufficient to dissolve the iron, separating the resulting iron oxide sludge from the reaction mixture, and purifying the sludge by levigating and washing out.

8. In the process of reducing an aromatic nitro compound involving the treatment with iron and an agent hydrolysable in water to produce hydrogen ions, to the production of the corresponding amine and an iron oxide sludge, the steps which consist in reducing in the presence of an acid-reacting dilute aqueous solution of a tin salt and of a salt of a rare earth metal, insufficient in amount to dissolve the iron, separating the iron oxide sludge from the reaction mixture and purifying the sludge by levigating and washing out.

9. In the process of reducing an aromatic nitro compound involving the treatment with iron and an agent hydrolysable in water to produce hydrogen ions, to the production of the corresponding amine and an iron oxide sludge, the steps which consist in reducing in the presence of a mixture of an acid and a dilute aqueous solution of a tin salt and of a salt of a rare earth metal, separating the iron oxide sludge from the reaction mixture and purifying the sludge by levigating and washing out.

10. In the process of reducing an aromatic nitro compound involving the treatment with iron and an agent hydrolysable in water to produce hydrogen ions, to the production of the corresponding amine and an iron oxide sludge, the steps which consist in reducing in the presence of a mixture of hydrochloric acid and a dilute aqueous solution of stannous chloride and of a salt of a rare earth metal, separating the iron oxide sludge from the reaction mixture and purifying the sludge by levigating and washing out.

11. In the process of reducing an aromatic nitro compound involving the treatment with iron and an aqueous solution of a salt acid-reacting due to hydrolysis and insufficient in amount to dissolve the iron, to the production of the corresponding amine and an iron oxide sludge, the steps which consist in reducing in the presence of a water-soluble tin salt and of an aqueous suspension of a sparingly soluble basic compound of a metal selected from the group consisting of a trivalent and a tetravalent metal, separating the iron oxide sludge from the reaction mixture and purifying the sludge by levigating and washing out.

12. In the process of reducing an aromatic nitro-compound involving the treatment with iron and an aqueous solution acid-reacting due to hydrolysis and insufficient in amount to dissolve the iron, to the production of the corresponding amine and an iron oxide sludge, the steps which consist in reducing in the presence of an aqueous solution of stannous chloride and of an aqueous suspension of a basic aluminium compound separating the iron oxide sludge from the reaction mixture and purifying the sludge by levigating and washing out.

13. In the process of reducing an aromatic nitro compound involving the treatment with iron and an aqueous solution acid-reacting due to hydrolysis and insufficient in amount to dissolve the iron, to the production of the corresponding amine and an iron oxide sludge, the steps which consist in reducing in the presence of an aqueous solution of stannous chloride and of an aqueous suspension of a basic aluminium compound which is precipitated by an aromatic amine from a soluble aluminium salt, separating the iron oxide sludge from the reaction mixture and purifying the sludge by levigating and washing out.

ULRICH HABERLAND.